(12) United States Patent
Manian et al.

(10) Patent No.: US 11,743,080 B2
(45) Date of Patent: Aug. 29, 2023

(54) SAMPLE-AND-HOLD-BASED RETIMER SUPPORTING LINK TRAINING

(71) Applicant: TEXAS INSTRUMENTS INCORPORATED, Dallas, TX (US)

(72) Inventors: Abishek Manian, San Jose, CA (US); Amit Rane, Santa Clara, CA (US); Ashwin Kottilvalappil Vijayan, Austin, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/083,008

(22) Filed: Oct. 28, 2020

(65) Prior Publication Data
US 2021/0409248 A1 Dec. 30, 2021

Related U.S. Application Data

(60) Provisional application No. 63/045,484, filed on Jun. 29, 2020.

(51) Int. Cl.
*H04L 27/01* (2006.01)
*H04L 25/03* (2006.01)

(52) U.S. Cl.
CPC ........ *H04L 27/01* (2013.01); *H04L 25/03057* (2013.01); *H04L 25/03343* (2013.01); *H04L 25/03885* (2013.01); *H04L 2025/0349* (2013.01)

(58) Field of Classification Search
CPC ............... H04L 27/01; H04L 25/03057; H04L 25/03343; H04L 25/03885; H04L 2025/0349
See application file for complete search history.

(56) References Cited

U.S. PATENT DOCUMENTS

| 3,879,664 | A | 4/1975 | Monsen |
| 7,321,621 | B2 | 1/2008 | Popescu et al. |
| 8,548,110 | B2 * | 10/2013 | Lin ........................ H04L 43/028 375/355 |
| 8,743,943 | B2 | 6/2014 | Shumarayev et al. |
| 8,964,826 | B2 | 2/2015 | Agrawal et al. |

(Continued)

OTHER PUBLICATIONS

International Search Report in corresponding PCT Application No. PCT/US2021/039486, dated Oct. 7, 2021 (2 pages).

(Continued)

*Primary Examiner* — Freshteh N Aghdam
(74) *Attorney, Agent, or Firm* — John R. Pessetto; Frank D. Cimino

(57) ABSTRACT

A linear retimer includes an equalizer, a clock recovery circuit, a sample and hold (S/H) circuit, and a linear driver. The equalizer receives an input signal and outputs an equalized signal. The clock recovery circuit receives the equalized signal and outputs a clock signal. The S/H circuit receives the equalized signal and the clock signal and outputs a retimed signal. The linear driver receives the retimed signal and outputs a recovered signal. The S/H circuit is configured to preserve a voltage of the equalized signal in the retimed signal. In some examples, the S/H circuit is part of a linear three-tap feedforward equalizer, and the linear driver receives an output of the feedforward equalizer. The linear retimer can be placed between a transmitter and a channel or after the channel.

19 Claims, 3 Drawing Sheets

(56) References Cited

U.S. PATENT DOCUMENTS

| | | | |
|---|---|---|---|
| 9,100,555 B2* | 8/2015 | Wang | G09G 5/008 |
| 9,210,008 B2 | 12/2015 | Rane | |
| 9,692,589 B2 | 6/2017 | Iyer et al. | |
| 9,935,839 B2* | 4/2018 | Li | H04L 41/0866 |
| 10,305,704 B1* | 5/2019 | Kenyon | H04L 25/03057 |
| 10,523,218 B2 | 12/2019 | Kuan et al. | |
| 10,659,337 B2 | 5/2020 | Riani et al. | |
| 2007/0052849 A1* | 3/2007 | Craddock | H04B 3/145 |
| | | | 348/536 |
| 2009/0182531 A1* | 7/2009 | Ekkizogloy | H04B 10/40 |
| | | | 702/182 |
| 2013/0208779 A1 | 8/2013 | Agrawal et al. | |
| 2014/0140385 A1* | 5/2014 | Ye | H04L 25/03885 |
| | | | 375/230 |
| 2015/0180587 A1* | 6/2015 | Kalogerakis | H04B 10/6971 |
| | | | 398/208 |
| 2016/0217872 A1* | 7/2016 | Hossain | G11C 27/02 |
| 2018/0262374 A1 | 9/2018 | Cheng et al. | |
| 2019/0044760 A1* | 2/2019 | Chiang | H04L 25/03878 |
| 2019/0363869 A1 | 11/2019 | Li et al. | |
| 2020/0409444 A1* | 12/2020 | Delshadpour | H04L 25/0286 |
| 2021/0021448 A1 | 1/2021 | Beukema | |

OTHER PUBLICATIONS

International Search Report in corresponding PCT Application No. PCT/US2021/038220, dated Oct. 14, 2021 (2 pages).

* cited by examiner

SAMPLE-AND-HOLD-BASED RETIMER SUPPORTING LINK TRAINING

CROSS-REFERENCE TO RELATED APPLICATION

This application claims priority to U.S. Provisional Application 63/045,484, filed Jun. 29, 2020, titled "Sample-and-Hold Based Linear Retimer Supporting Link Training," which is hereby incorporated by reference in its entirety.

BACKGROUND

Wired communications systems use link training to enable tuning of the finite impulse response (FIR) filters in the transmitters and receivers. However, nonlinear retimers cannot pass link training information directly from the input to the output. Instead, a digital signal processor detects the transmitter's FIR coefficients from the input signal and reconstructs it in the retimer output signal. The complex signal processing can consume large amounts of power.

SUMMARY

A retimer includes an equalizer, a clock recovery circuit, a sample and hold (S/H) circuit, and a linear driver. The equalizer receives an input signal and outputs an equalized signal. The clock recovery circuit receives the equalized signal and outputs a clock signal. The S/H circuit receives the equalized signal and the clock signal and outputs a retimed signal. The linear driver receives the retimed signal and outputs a recovered signal. The S/H circuit is configured to preserve a voltage of the equalized signal in the retimed signal. The retimer can be placed between a transmitter and a channel or after the channel.

In some examples, the S/H circuit is part of a three-tap feedforward equalizer, and the linear driver receives an output of the feedforward equalizer. In some examples, the S/H circuit is a first S/H circuit and the retimed signal is a first retimed signal. The three-tap FFE can include a second S/H circuit, a third S/H circuit, a first amplifier, a second amplifier, a third amplifier, and a summer. The second S/H circuit and the first amplifier receive the first retimed signal. The second S/H circuit outputs a second retimed signal, and the first amplifier outputs a first weighted signal. The third S/H circuit and the second amplifier receive the second retimed signal. The third S/H circuit outputs a third retimed signal, and the second amplifier outputs a second weighted signal. The third amplifier receives the third retimed signal and outputs a third weighted signal. The summer receives the first, second, and third weighted signals and combines them to obtain the FFE output signal.

In some examples, the S/H circuit includes two track and hold (T/H) circuits. One of the T/H circuits can include a preamplifier and a switched emitter follower. In some examples, the preamplifier includes a degeneration capacitor which has a capacitance chosen to extend a bandwidth of the preamplifier. In some examples, the T/H circuit includes a feedforward capacitor coupled between the preamplifier and the switched emitter follower. A capacitance of the feedforward capacitor can be chosen to reduce hold mode feedthrough.

BRIEF DESCRIPTION OF THE DRAWINGS

For a detailed description of various examples, reference will now be made to the accompanying drawings in which.

DETAILED DESCRIPTION

The disclosed retimers include a sample and hold (S/H) circuit to retime the received signal, which preserves the link training information while retiming jitter in the signal. Any appropriate S/H circuit may be used. The transmitter finite impulse response (FIR) coefficients are passed directly from the input to the output of the disclosed retimers without any complex digital signal processing. The retimers can be placed before or after the channel. A discrete-time linear feedforward equalizer can be implemented by cascading S/H circuits with weighted additions to reduce both precursor and postcursor inter-symbol-interference.

Figure 1:
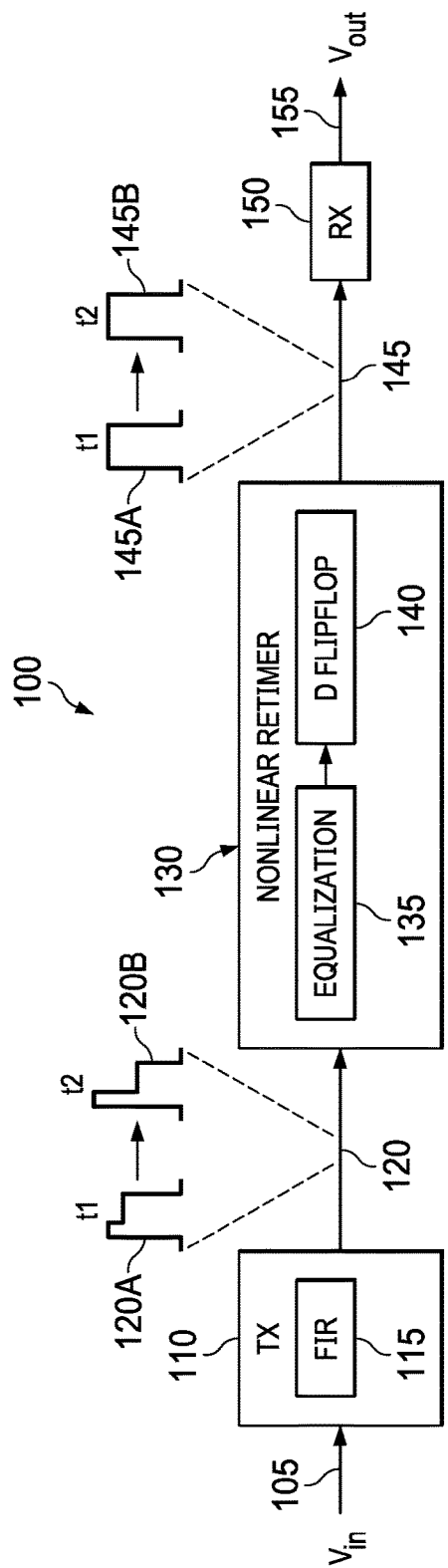
FIG. 1 illustrates an example communication system including a nonlinear retimer.

FIG. 1 illustrates an example communication system 100 including a nonlinear retimer 130 with a D flipflop 140. Communication system 100 includes a transmitter 110, the nonlinear retimer 130, and a receiver 150. A signal Vin 105 is provided to the transmitter 110 which includes a finite impulse response (FIR) filter 115. FIR filter 115 adds link training information to signal 120 output by transmitter 110, as shown in signal diagrams 120A-B which represent the voltage of signal 120 at a time t1 and signal 120 at time t2, respectively. Nonlinear retimer 130 includes an equalization module 135 and a D flipflop 140. The D flipflop 140 limits the voltage of signal 120 and cannot pass link training information to signal 145 output from nonlinear retimer 130.

The signal diagram 145A illustrates the constant voltage of signal 145 at time t1, in contrast to the varying voltage of signal 120 at time t1 as shown in signal diagram 120A. The signal diagram 145B illustrates the constant voltage of signal 145 at time t2, in contrast to the varying voltage of signal 120 at time t2. As illustrated in the signal diagrams 145A-B, the signal 145A at time t1 is the same voltage as the signal 145B at time t2, masking the link training information injected into signal 120 by the FIR 115 in transmitter 110. The signal 145 is provided to receiver 150 which outputs a signal Vout 155. Receiver 150 is unable to recover the link training information in signal 120 from FIR 115 in transmitter 110. A digital signal processor and a second FIR filter can be included in nonlinear retimer 130 to detect the link training information and reconstruct it at the second FIR filter, as described in U.S. Pat. No. 9,210,008. However, the digital signal processor and a second FIR filter cause nonlinear retimer 130 to consume large amounts of power.

Figure 2:
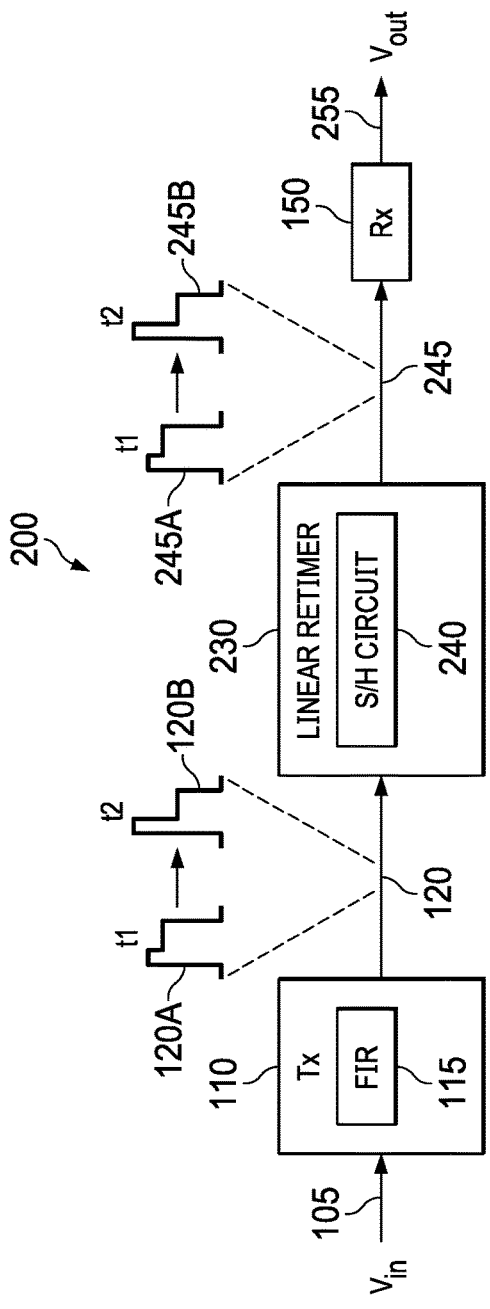
FIG. 2 illustrates an example communication system including a linear retimer.

FIG. 2 illustrates an example communication system 200 including a linear retimer 230 with a sample and hold (S/H) circuit 240. Communication system 200 is substantially similar to communication system 100 shown in FIG. 1, but includes linear retimer 230 instead of nonlinear retimer 130. Linear retimer 230 includes S/H circuit 240 as a retiming element, rather than a flipflop such as D flipflop 140. The S/H circuit 240 is transparent to link training and can pass the transmitter FIR information reliably without the need for complex digital processing, while still retiming the jitter, causing linear retimer 230 to consume less power than nonlinear retimer 130. In addition because it is linear, retimer 230 can be placed before or after the channel such that the transmitter FIR filter 115 can equalize channels both before and after linear retimer 230.

The signal 245 output from linear retimer 230 is represented by signal diagrams 245A-B which illustrate voltage changes in signal 245A at time t1 and in signal 245B at time t2, in contrast to the constant voltage of signal 145 output from nonlinear retimer 130. Receiver 150 receives the signal 245 from linear retimer 230 and outputs signal Vout 255. As signal diagrams 245A-B illustrates, receiver 150 is able to retain the voltage changes in signal 120 output from transmitter 110 in the output signal 255. Although the example shown herein includes a signal with two voltage levels, the S/H circuit 240 linearly passes voltage information, and linear retimer 230 can be extended to three, four, or more voltage level signals as well.

Figure 3:
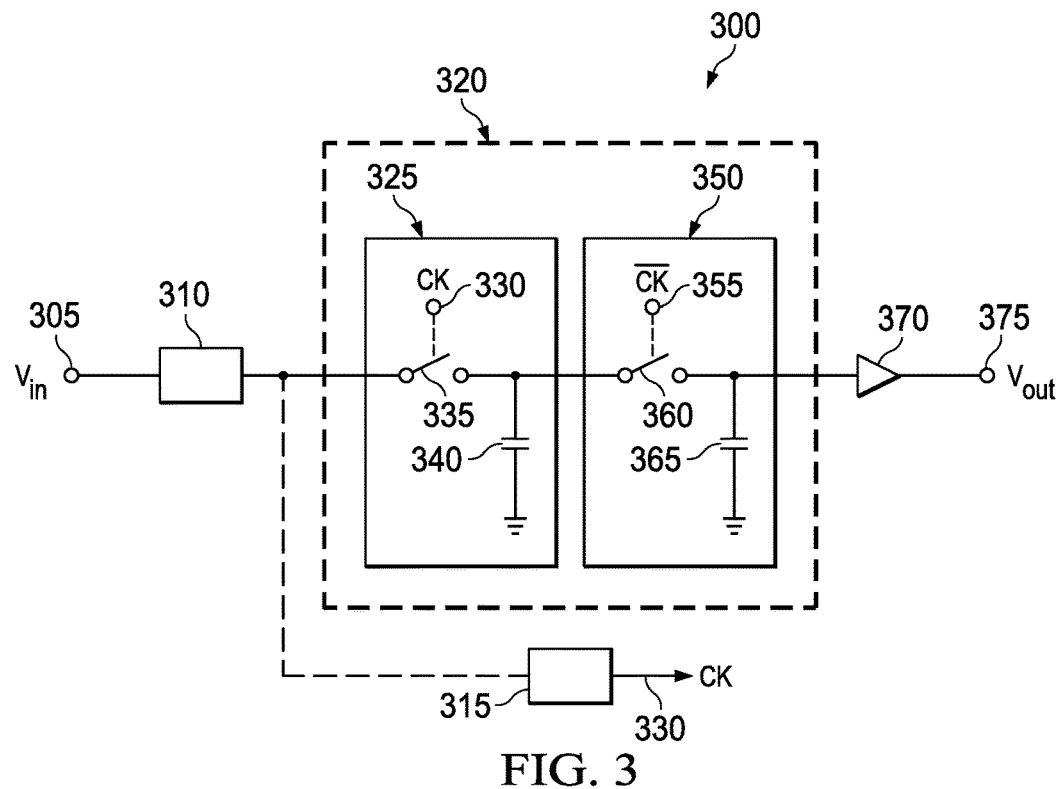
FIG. 3 illustrates a block diagram of an example linear retimer with a sample and hold circuit.

FIG. 3 illustrates a block diagram of an example linear retimer 300 with a sample and hold circuit 320. Linear retimer 300 includes an equalizer 310, a clock and data recovery module 315, the S/H circuit 320, and a linear driver 370. Equalizer 310 can be any appropriate equalizer, such as a continuous time linear equalizer. In this example, S/H circuit 320 includes two track and hold (T/H) amplifiers 325 and 350. T/H amplifier 325 includes a switch 335 and a capacitor 340, and T/H amplifier 350 includes a switch 360 and a capacitor 365. In T/H amplifier 325, switch 335 receives clock signal CK 330 from the clock and data recovery module 315 and is coupled between an output of equalizer 310 and T/H amplifier 350. Capacitor 340 is coupled to switch 335 and to ground 345.

In T/H amplifier 350, switch 360 receives a clock signal CK 355 that is inverted relative to clock signal CK 330, and is coupled between an output of T/H amplifier 325 and an input of linear driver 370. Capacitor 365 is coupled to switch 360 and to ground 345. Linear driver 370 receives the output from track and hold amplifier 350 and outputs the signal Vout 375. Because the S/H circuit 320 is linear, driver 370 is also linear to retain the transmitter FIR information.

Figure 4:
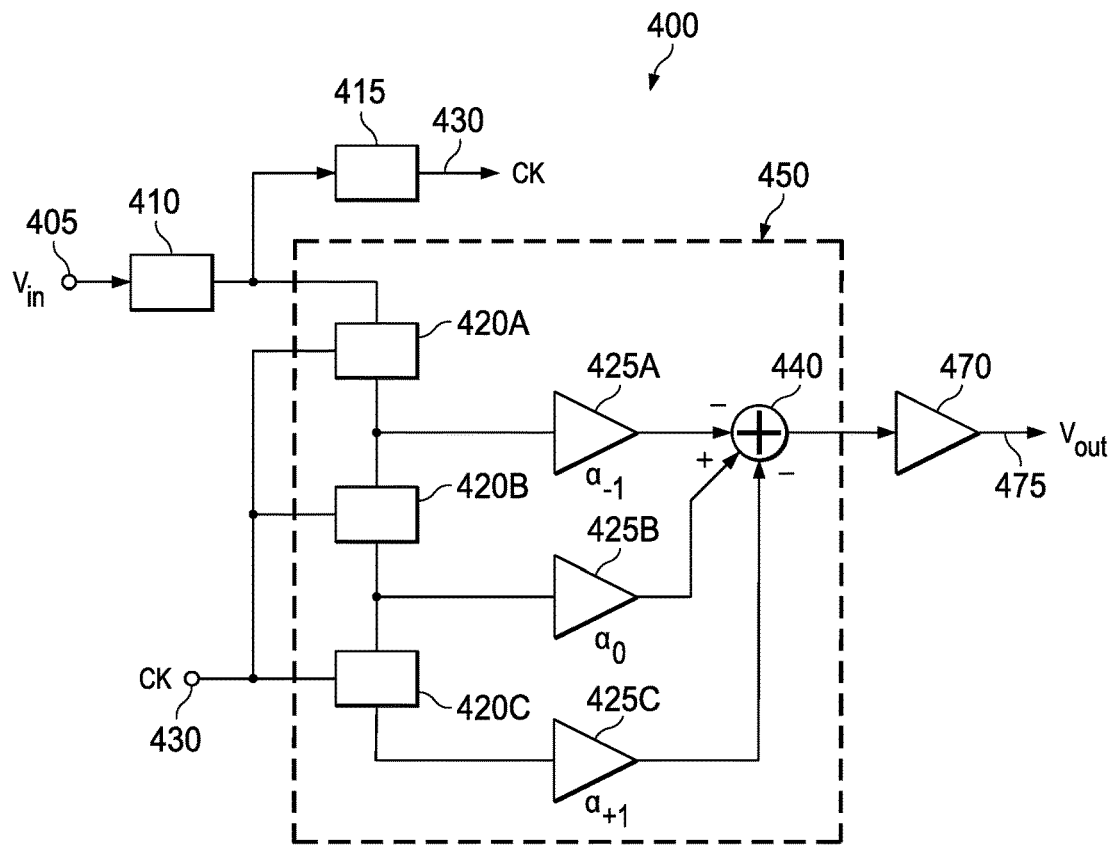
FIG. 4 illustrates a block diagram of an example linear retimer with a three-tap feedforward equalizer.

FIG. 4 illustrates a block diagram of an example linear retimer 400 with a three-tap feedforward equalizer (FFE) 450. Linear retimer 400 is substantially the same as linear retimer 300 shown in FIG. 3, but includes a three-tap FFE 450 rather than a S/H circuit 320. Three-tap FFE 450 includes three S/H circuits 420A-C, three linear amplifiers 425A-C, and a linear summer 440. The three S/H circuits 420A-C each receive a clock signal CK 430 from the clock and data recovery module 415. S/H circuit 420A is coupled to an output of equalizer 410 and provides its output to S/H circuit 420B and to an amplifier 425A, which multiplies the output from S/H circuit 420A by a weight α−1.

S/H circuit 420B provides its output to S/H circuit 420C and to an amplifier 425B, which multiplies the output from S/H circuit 420B by a weight α0. S/H circuit 420C provides its output to an amplifier 425C, which multiplies the output from S/H circuit 420C by a weight α+1. Summer 440 subtracts the outputs of amplifiers 425A and 425C from the output of amplifier 425B, substantially cancelling out precursor and postcursor ISI. The output from summer 440 is provided to a linear driver 470, which outputs a signal Vout 475.

Figure 5:
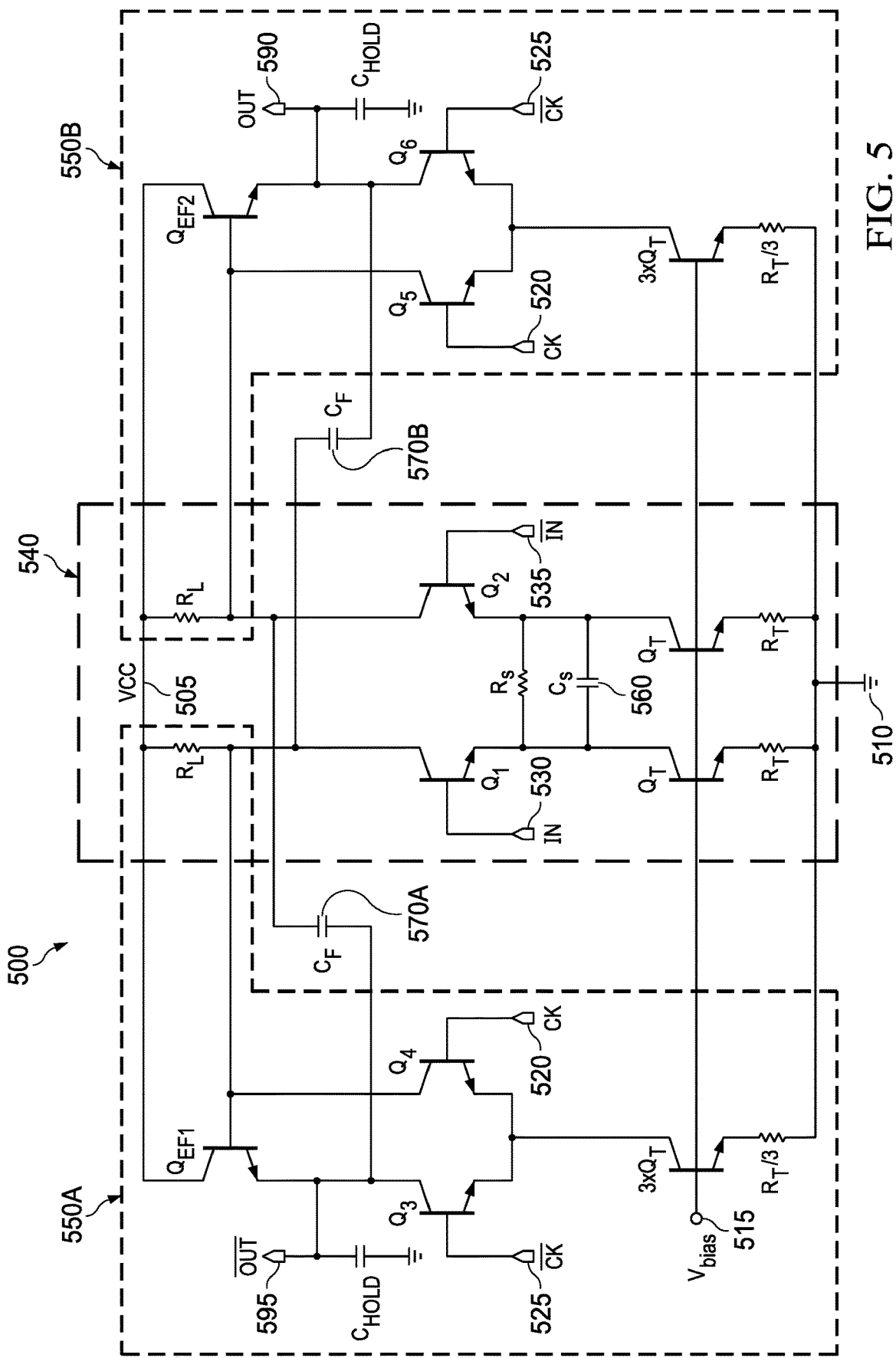
FIG. 5 illustrates an example track and hold amplifier for use in a sample and hold circuit.

FIG. 5 illustrates an example T/H amplifier 500 for use in a S/H circuit such as S/H circuit 320 shown in FIG. 3. T/H amplifier 500 includes a preamplifier 540 with two switched emitter followers 550A-B. Preamplifier 540 includes a degeneration capacitor Cs 560 coupled in parallel with the degeneration resistor Rs. Preamplifier 540 exhibits a pole at approximately:

$$\frac{1}{(RL)(C1)},$$

where C1 represents an input capacitance of the switched emitter follower 550A or 550B, and a pole at approximately:

$$\frac{1 + \frac{GmRs}{2}}{Rs\ Cs},$$

where Gm represents the transconductance of the transistors Q1 and Q2. Preamplifier 540 exhibits a zero at $$\frac{1}{(Rs)(Cs)}.$$

The capacitance of Cs 560 can be chosen such that the zero at $$\frac{1}{(Rs)(Cs)}$$

cancels out the pole at $$\frac{1}{(RL)(C1)},$$

extending the bandwidth of T/H amplifier 500. Feedforward capacitors Cf 570A-B are coupled between preamplifier 540 and switched emitter followers 550A-B, respectively, and cancel hold mode feedthrough by opposing the effect of the base-emitter capacitance of transistors QEF1,2 respectively.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:
1. A circuit comprising:
 a retimer comprising:
  an equalizer configured to receive an input signal and output an equalized signal;
  a clock recovery circuit configured to receive the equalized signal and output a clock signal;
  a sample and hold (S/H) circuit configured to receive the equalized signal and the clock signal and output a retimed signal;
 wherein the S/H circuit comprises a first track and hold (T/H) circuit and a second T/H circuit; and a linear driver configured to receive the retimed signal and output a recovered signal; wherein at least one of the first and second T/H circuits comprises:
a preamplifier; and
a switched emitter follower.

2. The circuit of claim 1, wherein the S/H circuit is further configured to preserve a voltage of the equalized signal in the retimed signal.

3. The circuit of claim 1, wherein the preamplifier further comprises a degeneration capacitor, wherein a capacitance of the degeneration capacitor is chosen to extend a bandwidth of the preamplifier.

4. The circuit of claim 1, wherein the at least one of the first and second T/H circuits further comprises a feedforward capacitor coupled between the preamplifier and the switched emitter follower, wherein a capacitance of the feedforward capacitor is chosen to reduce hold mode feedthrough.

5. The circuit of claim 1, wherein the retimer is configured to be placed between a transmitter and a channel.

6. The circuit of claim 1, wherein the retimer is configured to be placed after a channel.

7. The circuit of claim 1, wherein the S/H circuit further comprises a linear three-tap feedforward equalizer (FFE), and wherein the linear driver is configured to receive an FFE output signal.

8. The circuit of claim 7, wherein the S/H circuit is a first S/H circuit, wherein the retimed signal is a first retimed signal, and wherein the linear three-tap FFE further comprises:
a second S/H circuit configured to receive the first retimed signal and output a second retimed signal;
a third S/H circuit configured to receive the second retimed signal and output a third retimed signal;
a first amplifier configured to receive the first retimed signal and output a first weighted signal;
a second amplifier configured to receive the second retimed signal and output a second weighted signal;
a third amplifier configured to receive the third retimed signal and output a third weighted signal; and
a summer configured to:
receive the first, second, and third weighted signals; and
combine the first, second, and third weighted signals to obtain the FFE output signal.

9. An apparatus, comprising:
an equalization circuit coupled to an input;
a clock recovery circuit coupled to an output of the equalization circuit;
a sample and hold (S/H) circuit coupled to an output of the clock recovery circuit and the output of the equalization circuit; and
a linear driver coupled to an output of the S/H circuit and to an output;
wherein the S/H circuit comprises:
a first track and hold (T/H) circuit coupled to the output of the clock recovery circuit and the output of the equalization circuit; and
a second T/H circuit coupled to the output of the clock recovery circuit and an output of the first T/H circuit.

10. The apparatus of claim 9, wherein at least one of the first and second T/H circuits comprises:
a preamplifier coupled to an input of the at least one of the first and second T/H circuits;
a switched emitter follower coupled to an output of the preamplifier and to an output of the at least one of the first and second T/H circuits; and
a feedforward capacitor coupled between the preamplifier and the switched emitter follower.

11. The apparatus of claim 10, wherein a capacitance of the feedforward capacitor is chosen to reduce hold mode feedthrough.

12. The apparatus of claim 10, wherein the preamplifier exhibits a pole at:

$$\frac{1}{(RL)(C1)}$$

where RL represents a resistance of a load resistor in the preamplifier and C1 represents a capacitance of the switched emitter follower at the output of the preamplifier, wherein the preamplifier further comprises a degeneration capacitor, wherein the preamplifier exhibits a zero at:

$$\frac{1}{(Rs)(Cs)}$$

where Rs represents a resistance of a degeneration resistor in the preamplifier and Cs represents a capacitance of the degeneration capacitor, wherein the capacitance Cs is chosen such that the zero cancels out the pole.

13. The apparatus of claim 9, further comprising a linear feedforward equalizer (FFE) coupled to an output of the clock recovery circuit and the output of the equalization circuit, wherein the linear FFE comprises the S/H circuit.

14. An apparatus, comprising:
a first sample and hold (S/H) circuit configured to generate a first retimed signal;
a first amplifier configured to generate a first weighted signal based on the first retimed signal;
a second S/H circuit configured to generate a second retimed signal based on the first retimed signal;
a second amplifier configured to generate a second weighted signal based on the second retimed signal;
a third S/H circuit configured to generate a third retimed signal based on the second retimed signal;
a third amplifier configured to generate a third weighted signal based on the third retimed signal; and
a summer configured to combine the first, second, and third weighted signals.

15. The apparatus of claim 14, further comprising:
an equalization circuit configured to generate an input signal for the first S/H circuit;
a clock recovery circuit configured to generate a clock signal for the first, second, and third S/H circuits; and
a linear driver configured to generate an output signal based on an output from the summer.

16. The apparatus of claim 14, wherein at least one of the first, second, and third S/H circuits comprises a first track and hold (T/H) circuit and a second T/H circuit.

17. The apparatus of claim 16, wherein at least one of the first and second T/H circuits comprises:
a preamplifier; and
a switched emitter follower.

18. The apparatus of claim 17, wherein the preamplifier further comprises a degeneration capacitor configured to extend a bandwidth of the preamplifier.

19. The apparatus of claim 17, wherein the at least one of the first and second T/H circuits further comprises a feedforward capacitor coupled between the preamplifier and the switched emitter follower, wherein a capacitance of the feedforward capacitor is configured to reduce hold mode feedthrough.

* * * * *